United States Patent

[11] 3,524,385

| [72] | Inventor | Jack B. Ottestad<br>La Jolla, California |
|---|---|---|
| [21] | Appl. No. | 695,194 |
| [22] | Filed | Jan. 2, 1968<br>Continuation-in-part of Ser. No. 564,320,<br>filed July 11, 1966, now Pat. No. 3,363,513 |
| [45] | Patented | Aug. 18, 1970 |
| [73] | Assignee | Impulse Products Corporation<br>San Diego, California<br>a Corp. of California |

[54] CONTROL MEANS FOR FLUID-POWERED DEVICES
15 Claims, 5 Drawing Figs.

[52] U.S. Cl.................................................. 91/224,
91/234, 91/235, 91/394, 91/416
[51] Int. Cl....................................................... F01l 15/12,
F01l 21/02, F15b 15/17
[50] Field of Search............................................ 91/224;
91/234 (cursory), 235 (cursory), 321 (cursory),
417 (cursory), 416 (cursory), 225 (cursory)

[56] References Cited
UNITED STATES PATENTS

| 2,987,051 | 6/1961 | Goyette et al. ............... | 91/224 |
| 3,105,414 | 10/1963 | Cvyotkovic et al......... | 91/392 |
| 208,449 | 9/1878 | Winchester.................. | 91/225 |
| 2,851,013 | 9/1958 | Doughton.................. | 91/225 |

Primary Examiner— Paul E. Maslousky
Attorney— Carl R. Horten, David W. Tibbott and Bernard J. Murphy ABSTRACT: Fluid control means, employing a valving member, to automatically cycle the operation of the device. The valving member is translated in one direction, as the device is fluid-charged, to a point at which said valving opens passages to "fire" the device; firing of the device returns the valving in the alternate direction, for re-charging of the device.

Patented Aug. 18, 1970   3,524,385

INVENTOR
JACK B. OTTESTAD

Bernard J. Murphy
AGENT

Patented Aug. 18, 1970                3,524,385

INVENTOR
JACK B. OTTESTAD
Bernard J. Murphy
AGENT

CONTROL MEANS FOR FLUID-POWERED DEVICES

This is a continuation-in-part of applicant's copending patent application, Ser. No. 564,320, filed July 11, 1966, titled "Impact Ram," now Pat. No. 3,363,513.

The invention pertains to fluid control means for fluid-powered devices, and in particular to such control means providing automatic re-cycling of the operation of the device.

Fluid-powered devices known in the prior art have external control elements which must be manipulated to cause the device to execute repetitive cycles of operation. One of such control means is incorporated in my above-noted co-pending patent application for my novel Impact Ram. In that application, the control means comprised an external two-position valve which, in one position, "charged" the ram, and in the alternate position "fired' the ram. It is necessary, according to the teaching of that application, for the operator of the device, to switch the valve, manually, from one position to the other, and back again, continuously to cycle the ram. Here, it might serve to review the structure and function of my prior co-pending application as a means toward an understanding of the improved control means taught by this continuation-in-part application.

The impact ram, according to my co-pending application, includes a body having an internal body cylinder extending along an axis of motion. The cylinder is closed at a first end of the body and open at a second end. A plunger is axially slidable in the body cylinder, and is adapted to be connected to an object, an example being an impact head for use as a hammer, which object is disposed outside the body. The plunger or means projects through the open second end of the body cylinder.

The plunger has a lateral dimension which is less than a corresponding internal lateral dimension of the body cylinder. The plunger carries a collar which makes a continuous peripheral fluid-sealing contact with the inside wall of the body cylinder. A sliding seal disposed between the plunger and the body forms one boundary of a variable volume return chamber, the other boundaries of which are an inner wall of the body, the collar, and the exterior surface of the plunger which has said lesser lateral dimension.

A return face is disposed on the collar which faces into the said return chamber. Fluid pressure in the return chamber returns the plunger axially toward the first end of the body. A triggering surface on the collar faces the closed end of the cylinder.

A plunger cylinder extends axially in the plunger. A piston axially floats in the plunger cylinder. The piston makes a fluid-sealing fit with the inner wall of the plunger cylinder. The plunger cylinder is open at its end facing the said first end of the body cylinder and is closed at its other end. The piston forms an accumulator chamber of variable volume between itself and the closed end of the plunger cylinder.

A peripheral charging seal includes a surface on the plunger that is disposed laterally of the triggering surface, and a complementary surface on the body inside the cylinder. When these surfaces mate to form a seal, there is an axial spacing which forms a triggering chamber between the triggering surface and the body. The triggering chamber, when the elements of the device are in such a position, is fully closed. At this time, the piston faces the region of the body which is inside the seal. It faces this region through the open end of the plunger, and forms a charging chamber therein.

Respective port means are provided for admitting fluid under pressure to the return chamber, the triggering chamber, the charging chamber, and the accumulator chamber.

Conduitry connects the respective port means with the external, manually-operated, two-position valve means.

My prior, co-pending application disclosed, but set forth no claims to, a means for automatically controlling a constant uninterrupted supply of pressured fluid, without external, manually-operated valve means, to effect repetitive re-cycling of the operation of the fluid-operated device. Accordingly, the present application repeats the portion of the prior, co-pending application which recites the abovementioned disclosure, and adds thereto teachings of other, alternate embodiments of my novel fluid control means.

It is an object of the present invention, then, to provide control means for fluid-powered devices, such as an impact ram or the like, automatically operative to effect repetitive re-cycling of the operation of said devices.

It is another object of this invention to provide control means of the type noted, automatically operative to constantly recycle operation of a fluid-powered device supplied by an uninterrupted pressured fluid.

It is another object of this invention to provide control means of the type noted further characterized in having means for adjusting the fluid-pressure threshold at which said control means become operative.

A feature of this invention comprises the use of a poppet, carried internally by a translating member of the device, to alternately open and close pressured-fluid valving passages whereby the device is continuously cycled.

Further objects and features of this invention will become more apparent by reference to the following discussion taken in conjunction with the accompanying figures, in which.

In the ensuing discussion, the term "forward" and "rearward" denote the ends of the control means adjacent to the charging chamber and adjacent to the vent chamber, respectively. Thus, the vent chamber is at the "rear"; other structures, then, in relation thereto, are "forwardly" disposed.

Figure 1:
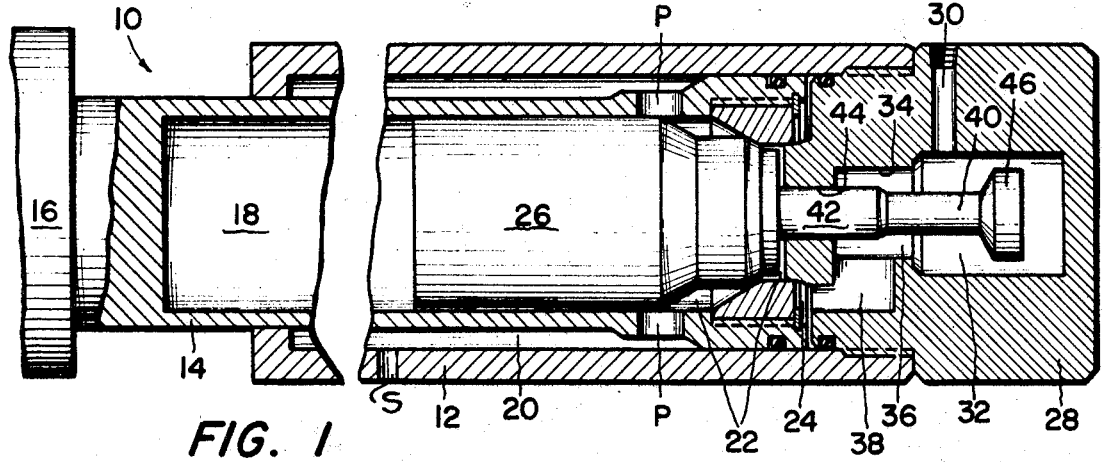
FIG. 1 is a partial, axial cross-sectional view of an impact ram with fluid control means according to the invention, showing the piston-carried poppet in a given operating position.

In FIG. 1 my novel fluid control is shown in use, by way of example, with an impact ram 10. According to the priorly given review, the impact ram 10 has a body 12 and a sliding plunger 14. The plunger 14 carries an impact head 16 on the external and forward end thereof for the working of material. The ram has an accumulator chamber 18 which receives a residual charge of compressible fluid by means of valving (not shown). A return chamber 20 receives pressured fluid, from an uninterrupted supply of pressured fluid, by means port S formed in the wall of body 12. The fluid is provided to "return" or move the plunger 14 rearward (toward the right, as viewed in FIG. 1). A charging chamber 22 is provided for receiving the fluid from return chamber 20, via ports "P" formed in a wall of plunger 14, for "charging" of the device against the accumulator chamber pressure. A triggering chamber 24 is provided to receive a triggering pressure whereby the device can be "fired." A piston 26 separates the accumulator and charging chambers, and is the vehicle by means of which the fluid in the accumulator chamber is further compressed so as to "charge" or "cock" the device. It is to be noted that, as illustrated in FIG. 1, chamber 22 is partitioned, by the piston 26. Piston 26 has a stepped nose, defining thereon differing surfaces of graduated dimensions. One of the surfaces seals against the plunger 14, forming forwardly and rearwardly thereof portions of the same chamber 22. When the piston is moved forwardly, the partitioning of the chamber 22 is removed.

The structural details and operating characteristics of these elements are fully disclosed in my earlier referenced, co-pending application. Accordingly, further discussion here is not considered to be necessary. What follows, then, is a description of a first embodiment of my novel fluid control means.

An end cap 28 is replaceably fixed to the rearward end of body 12. Cap 28 has a vent 30 which enters a vent chamber 32 on the opposite side of a valve land 34 from the piston 26. A cycling or exhaust chamber 36 is disposed on the other side of valve land 34 and connected to the triggering chamber 24 by passage 38. Both chambers surround a poppet 40 which is attached to the nose of piston 26. Accordingly, passageway means are provided for communication between the exhaust and vent chambers 36 and 32, between the exhaust and charging chambers 36 and 22, and between the exhaust and triggering chambers 36 and 24, all of which means are under the control of the poppet 40.

Poppet 40 includes a valve land 42 which makes a reasonably close fit with valve land 44 of the cap, although some minor leakage past land 44 is tolerable. However, lands 42 and 44 should make a reasonably good seal to enable the device to cycle at optimum rates and efficiencies.

A valve land 46 rearwardly disposed on the poppet is adapted to make a similar class of fit with valve land 34 formed in end cap 28. The lengths and locations of the lands are such that lands 42 and 44 are overlapped until lands 34 and 46 are overlapped, after which the former separate. Thus, in the position of FIG. 1, the distance from the left edge of land 44 to the right edge of land 42 is greater than the distance from the right edge of land 34 to the left edge of land 46.

The operation of my novel fluid control is as follows.

FIG. 1 shows the start of a cycle. Lands 42 and 44 initially close off the rearward portion of charging chamber 22 from the vent 30. Cycling or exhaust chamber 36 is vented, as is the triggering chamber 24, past land 34. As the device is charged (FIG. 2) the plunger 14 is held to the cap 28 by fluid pressure in return chamber 20, and the piston 26 moves forward. The axial lengths of lands 44 and 42 are such as to continue sealing therebetween after the piston 14 has communicated both the forward and rearward portions of chamber 22. Sequentially, lands 34 and 46 join, closing the vent 30 to passage 38 and the triggering chamber 24. Then land 42 clears land 44. This releases pressure from the charging chamber 22 into the triggering chamber 24 through passage 38, firing the device, whereby the plunger 14 is rapidly thrust forwardly.

On firing of the device the piston 26 returns rearwardly (FIG. 3), first closing the rearward portion of charging chamber 22 from vent 30 by means of lands 42 and 44, and opening the cycling or exhaust chamber 36 to vent 30. This venting of chamber 36 enables the plunger 14 and the piston 26 to return to the position of FIG. 1. Then the cycle will automatically repeat, as port "P" continuously feeds in an uninterrupted supply of pressured fluid.

Note that the only reversal of flow direction is in the short passage 38 rather than in long lines. Flow through long lines is unidirectional.

Figure 4:
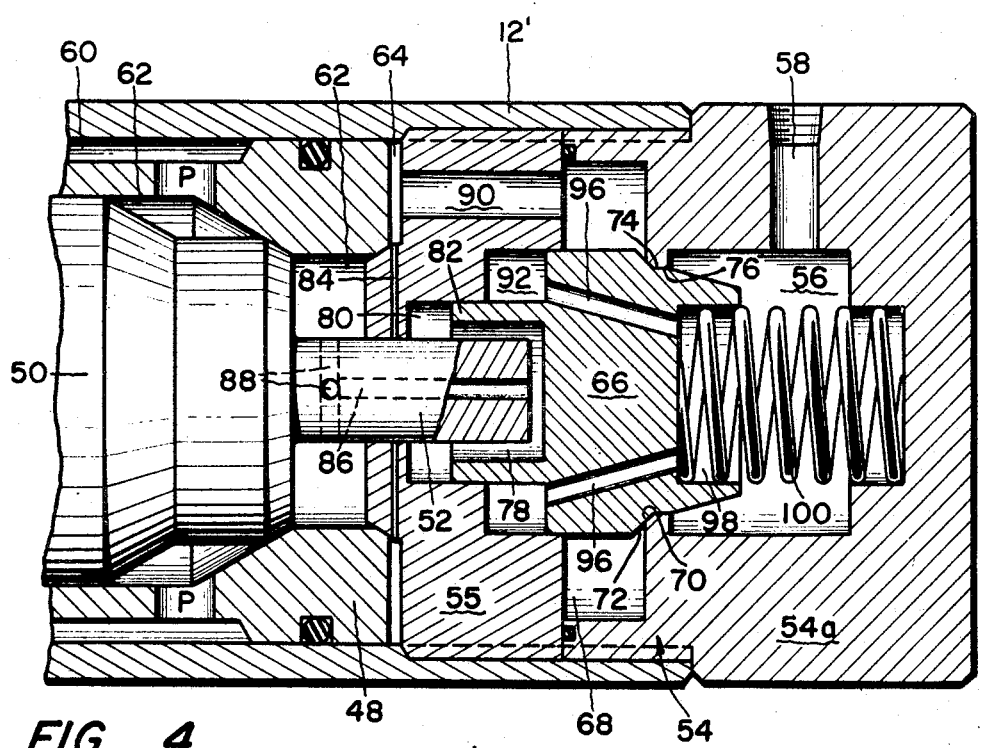
FIG. 4 is a partial, axial cross-sectional view of an alternate embodiment of my novel fluid-control means.

An alternate embodiment of my invention is shown in FIGURE 4 where the body 12' receives a plunger 48 in which is disposed a slidable piston 50. The piston has a stem 52 fixed to the rearward-facing end thereof. An end cap 54 is fixed to the end of the body 12'. End cap 54 comprises a cap 54a and a valve block 55. Cap 54a has formed therein a vent chamber 56 which communicates with a vent 58. Return, charging, and triggering chambers are denoted by index numerals 60, 62 and 64. As shown in FIG. 4, a surface of piston 50, seating against a surface of plunger 48, partitions chamber 62.

A valving member 66 is slidably disposed in an exhaust chamber 68 formed within cap 54a. Between exhaust chamber 68 and vent chamber 56 there is formed a shoulder which presents a valve seat 70. Valve seat 70 receives a valve face 72 formed on the surface of valving member 66. Further, lands 74 and 76 formed on the valving member 66, and on the shoulder adjacent the valving seat 70, respectively, cooperate to seal between exhaust chamber 68 and vent chamber 56. Valving member 66 also has formed centrally thereof a pilot pressure chamber 78 which receives the stem 52. A cavity 80 formed within the end cap 54 receives a forwardly disposed stub end 82 of the valving member 66 for relative sliding motion therebetween.

Valve block 55 has triggering ports 84 formed radially therethrough which communicate cavity 80 and chamber 62 with triggering chamber 64. An axial channel 86, formed through the center of the stem 52, communicates with the pilot pressure chamber 78 at the rearward end of the channel, and further communicates with radial channels 88 also formed in the stem 52 at the forward end thereof immediately adjacent the piston 50. The radial channels 88 communicate with charging chamber 62.

An unloading passageway or channel 90 communicates exhaust chamber 68 with triggering chamber 64. A larger bore 92 is formed within valve block 55 between exhaust chamber 68 and cavity 80. Bore 92 is provided to receive the large outside dimension of valving member 66 for relative slidable motion therebetween. Converging channels 96 are formed diagonally within valve member 66 and communicate at the forward end thereof with bore 92, and at the rearward end thereof with an axial channel or recess 98 formed in a rearward, cylindrical termination of valving member 66. Converging channels 96 and axial channel 98 provide means for venting bore 92 to chamber 56. Finally a compression spring 100 is disposed within axial channel 98, the ends thereof bearing against valving member 66 and end cap 54.

In operation fluid pressure is introduced by way of return chamber 60 and ports "P" to the forward portion of chamber 62. The effect of this pressure is to translate piston 50 forwardly. Then the fluid pressure communicates, via radial channels 88 and axial channel 86 and is received in pilot pressure chamber 78. This pressure in chamber 78 bears against valving member 66; it causes valve face 72 to close on valve seat 70 to effect sealing between chamber 68 and 56. As the device is charged and the piston 50 continues to move forwardly, the valve stem 52 carried therewith is withdrawn from the pilot pressure chamber 78. Ultimately, the stem 52 will travel so far as to clear triggering ports 84. At that moment, the fluid pressure in charging chamber 62 then freely communicates with triggering chamber 64. Thus the device is fired.

On firing, the fluid pressure is also communicated through unloading passageway 90 from charging and triggering chambers 62 and 64 to exhaust chamber 68. There the fluid pressure bears against valve face 72. Valve face 72 presents a slightly greater surface area than that exposed within cavity 80. Accordingly, the pressure bearing thereagainst causes the valving member 66 to move forwardly into bore 92 and cavity 80. Subsequently, the seal between valve seat 70 and valve face 72 is broken and the fluid pressure is free to escape by way of vent chamber 56 and vent 58

This venting does not occur immediately with firing of the device. Valve face 72 while having a slightly greater effective surface area nevertheless presents a limited surface area for the fluid pressure. Thus, the pressure can but slowly translate the valving member 66. The land 74 moves across the land 76, maintaining the seal for a period of time necessary to insure a completion of the stroke, the full translation, of plunger 48. When the rearward termination of land 74 reaches the rearward termination of valve seat 70, then is the seal broken; then the fluid pressure is free to vent.

The compression spring 100 is optional, depending upon the use and structural tolerances of the device. That is to say, that compression spring 100 normally is not required for the proper functioning of my novel control means. However, in some operations where the device with which the control means is used is inverted, the effect of gravity upon valve member 66, coupled with internal friction, wear, and the like, may be such as to militate against the unseating of member 66. Compression spring 100 is provided to overcome this difficulty.

Yet a further embodiment of my invention is shown in FIG. 5 where again body 12' receives a plunger 102. Plunger 102 receives a sliding piston 104, and body 12' has fixed to the end thereof end thereof end cap 106. End cap 106 comprises a cap 107 and a valve block 108. The valve block 108 is disposed between cap 107 and piston 104. A vent chamber 110 is formed within the cap 107 and communicates with a vent 112 for the exhausting of fluid. The return, charging, and triggering chambers are denoted by index numerals 114, 116, and 118.

A hollow valving member 21 is slidably disposed in an exhaust chamber 122 formed centrally of cap 107. Cap 107 has formed therewithin a shoulder which presents a valve seat 71. Valve seat 71 receives a valve face 25 formed on valving member 21. Lands 73 and 29 formed of the shoulder in cap 107 and valving member 21, respectively co-operate with the valve seat and valve face to seal between exhaust chamber 122 and vent chamber 110.

A cylindrical sleeve 31 is disposed within an axial bore 33, formed in valving member 21. The cylindrical sleeve 31 has an inner cylindrically-bored surface 37 of generally uniform cross-section except toward the forward end thereof where it defines a pilot pressure chamber 39 of slightly greater cross-section. A poppet 45 is carried slidably within cylindrical sleeve 31. The poppet 45 closes a pilot pressure channel 57, of smaller cross-section than the general cross-sectional dimension of surface 37, which channel is formed in the forward extremity of the sleeve 31. A nose portion 41, defined on the forward end of the poppet 45, projects partially into the pilot pressure channel 57 to effect the sealing thereof. A shank 47 forming the rear portion of the poppet 45 receives thereabout one end of a compression spring 49. The other end of spring 49 bears against a follower seal 43. A threaded adjustment rod 65 is received in a tapped plate 67 fixed to the end cap 106, and bears against the follower seal 43.

A triggering port 53 is formed through the wall of the valving member 21 and communicates with a triggering port 51 formed through the wall of the cylindrical sleeve 31. Port 51 opens on a larger counterbore 51a formed in the outer surface of sleeve 31; the counterbore insures a communication of ports 53 and 51 regardless of the sliding translations and any rotational reorientations of valving member 21. Triggering ports 53 and 51 are provided to communicate between exhaust chamber 122 and pilot pressure chamber 39. A communicating passageway 75, formed in valve block 108, joins exhaust chamber 122 with triggering chamber 118. A large recess 81 formed in valve block 108 receives the larger outside dimension of valving member 21 for sliding motion therewithin. A diagonal channel 63, formed in member 21, communicates the bore 81 with vent chamber 110. A compression spring 83 is disposed between valving member 21 and cap 107. Spring 83 serves the same purpose as does spring 100 of the embodiment of FIG. 4.

Figure 5:
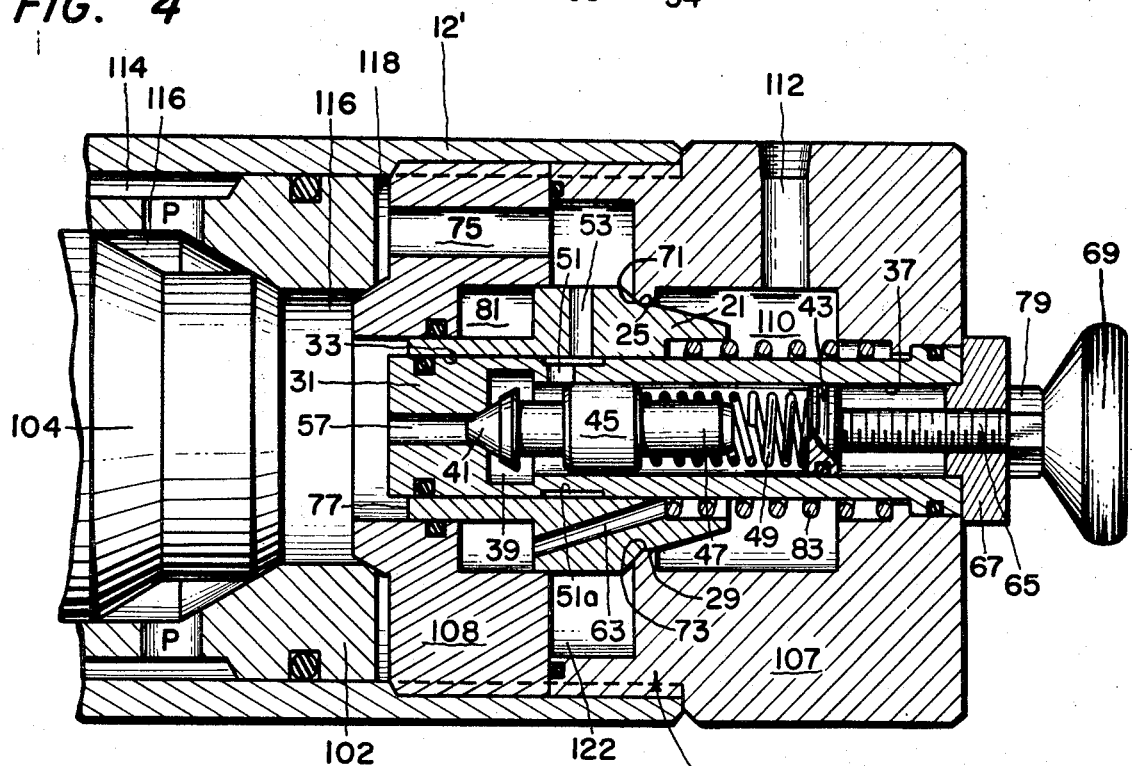
FIG. 5 is a partial, axial cross-sectional view of a further embodiment of my novel fluid control means.

The embodiment of my invention shown in FIG. 5 is adjustable for differing pressure-operations. This adjustability is provided for by compression spring 49. The rod 65 has integral therewith a head 69, and a lock nut 79, both external of the cap 107, to provide for manual adjustment of the pressure with which spring 49 bears against poppet 45. By adjusting the compression of spring 49, by means of head 69, the "cracking pressure", i.e., the amount of pressure in charging chamber 116 which will displace poppet 45, and admit fluid pressure through channel 57, and ports 51 and 53, can readily be altered.

Finally, it is to be noted that the valving member 31 presents a circumferential rim 77 to the charging chamber 116. The charging pressure in chamber 116 bears against the surface of rim 77 to insure a closure of valve face 25 on valve seat 71.

In operation, this embodiment functions similarly to that of the embodiment of FIG. 4. except for the priorly noted added provision for an adjustment of the "cracking pressure" at which it is desired to have the valve means operative. When fluid pressure is introduced by way of port "P" the pressure displaces piston 104, forwardly, communicating both portions of chamber 116. Thereafter the pressure is addressed to rim 77, to seat the valving member 21, and the pressure is also introduced to the pilot pressure channel 57 and bears against the nose portion 41 of the poppet 45.

Depending upon the rise of pressure in charging chamber 116, in relation to the resistance of spring 49, nose portion 41 will eventually be displaced, rearwardly, from pilot pressure channel 57 and admit fluid pressure to triggering port 51. At some given charging pressure, then, the admitted fluid pressure will unseat nose portion 41, communicate through ports 51 and 53, exhaust chamber 122, and communicating passageway 75 to triggering chamber 118. There it causes the device to fire. The fluid pressure is also communicated through connecting passageway 75 and exhaust chamber 122 and bears against the exposed portion of valve face 25. This pressure bearing thereon will subsequently cause a separation of valve seat 71 and valve face 25 and allow the fluid pressure to escape by way of vent chamber 110 and vent 112. Here too, however, juxtaposed lands 73 and 29 insure a continuance of the seal until the plunger 114 has completed its full stroke.

As explained herein, at some charging pressure-variations thereof being effected by adjusting the bias of spring 49 - the device will fire. For a given effective pressure, piston 104 will have moved forward a given distance when poppet 45 will open the charging-to-triggering-chambers' channels.

Figure 2:
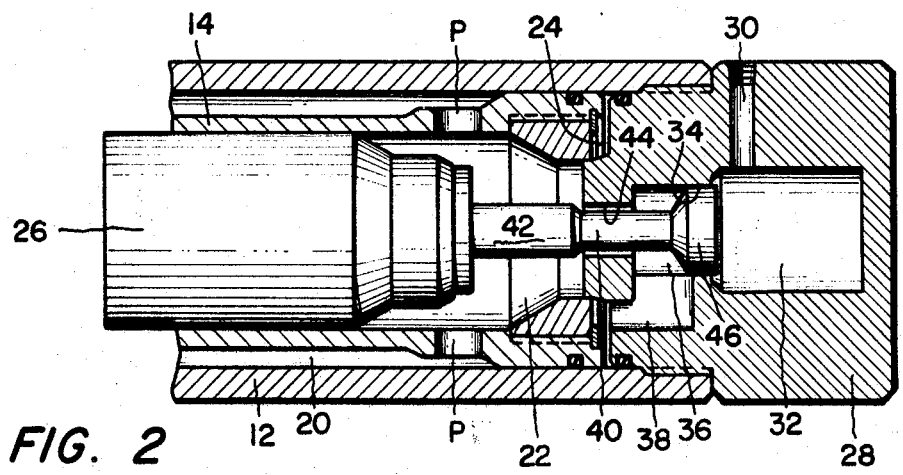
FIG. 2 is a fragmental, axial cross-sectional view of the fluid-control means of FIG. 1 in a further operating position.
Figure 3:
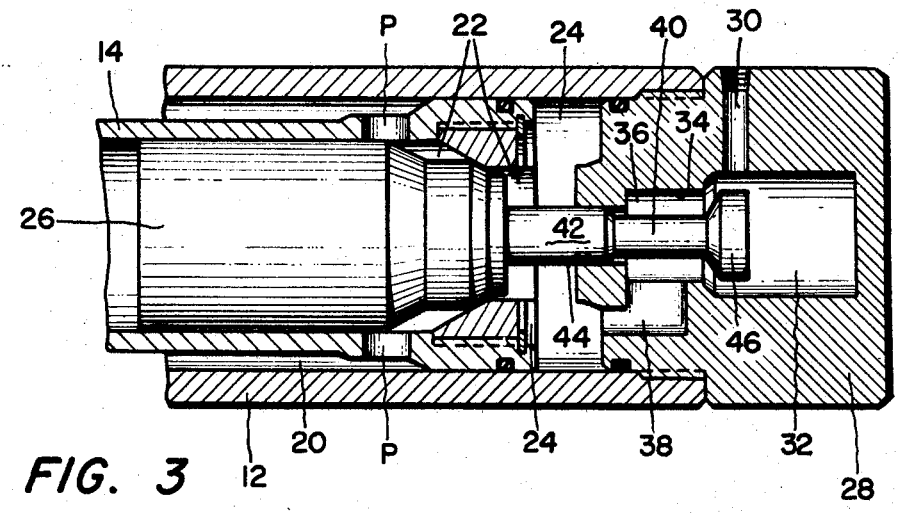
FIG. 3 is a fragmental, axial cross-sectional view of the fluid control means of FIG. 1 in yet a further operating position.

The embodiments of my invention, as dipicted in FIGS. 4 and 5, like the first embodiment shown in FIGS. 1, 2, and 3, teach a control means with a plurality of passageway means for communicating exhaust and vent chambers, for communicating exhaust and charging chambers, and for communicating exhaust and triggering chambers, fluid flow through all passageway means of said plurality being automatically controlled by means slidably disposed within the control means. Further, the embodiment of FIG. 5 teaches means for adjustably controlling the "cracking pressure" of the control means, whereby the firing or charging pressure, and the amount of stored energy necessary to effect the firing, can be readily adjusted. And all the embodiments when used with a device being supplied with an uninterrupted pressured fluid, will cause recurring re-cycle operation of the device.

I claim:

1. Control means, for automatically recycling operation of fluid-powered devices, such as impact rams and the like, which have means for receiving a supply of pressured fluid, a movable, working member, variable-volume, charging and triggering chambers for receiving charging and triggering volumes of the fluid, respectively, with means disposed resiliently to oppose said charging volume, said member being effective, when moved in a first direction, to seal between said chambers, said charging volume of the fluid being effective to hold said member in said first direction, and said triggering volume of the fluid being effective to trigger said member into movement in a second direction to open said seal, and to permit said charging volume to operate upon said member so as to effect further movement of said member in said second direction, comprising:
    means disposed adjacent to one of said charging and triggering chambers defining exhaust and vent chambers for receiving said fluid;
    a vent port communicating with said vent chamber;
    a plurality of passageway means for communicating said exhaust chamber with said vent, charging and triggering chambers; and
    means slidable within said chamber-defining means, automatically operative, in response to said charging volume of fluid, first to prohibit fluid flow through all passageway means of said plurality, next to admit fluid flow only through said passageway means which communicate said exhaust chamber with said charging and triggering chambers, and then to admit fluid flow only through said passageway means which communicate said exhaust chamber with said vent and triggering chambers;
    whereby said device on being coupled to an uninterrupted supply of fluid is automatically operatively recycled by an automatic and repetitive stroking of said slidable means.

2. Control means, according to Claim 1, wherein:
    said plurality comprises a first passageway means for communicating said vent and exhaust chambers, a second passageway means for communicating said exhaust and charging chambers, and a third passageway means for communicating said exhaust and triggering chambers.

3. Control means according to Claim 1, wherein:
said opposing means comprise a piston;
a shoulder separates said exhaust and vent chambers;
a first land separates said exhaust and charging chambers;
said shoulder has a second land; and
said slidable means comprise a poppet attached to and extending from said piston;
said poppet has axially-spaced-apart third and fourth lands;
said first and third lands are cooperative to communicate and to seal between said exhaust and charging chambers, and said second and fourth lands are cooperative to communicate and to seal between said exhaust and vent chambers.

4. Control means, according to Claim 3, wherein:
said first and third lands are cooperative to prohibit and to permit fluid flow between said exhaust and vent chambers, between said exhaust and charging chambers, and between said charging and triggering chambers.

5. Control means, according to Claim 3, wherein:
said second and fourth lands are cooperative to prohibit and to permit fluid flow between said exhaust and vent chambers, and between said vent and triggering chambers.

6. Control means, according to Claim 3, wherein:
said first and third lands cooperate to prohibit fluid flow therebetween when said second and fourth lands cooperate to admit fluid flow therebetween.

7. Control means, according to Claim 3, wherein:
said first and third lands cooperate to admit fluid flow therebetween when said second and fourth lands cooperate to prohibit fluid flow therebetween.

8. Control means, according to Claim 1, wherein:
said opposing means comprise a piston;
said slidable means comprise a valving member disposed between said exhaust and vent chambers for throttling fluid flow therebetween, and
a stem attached to and extending from said piston, operatively disposed for throttling fluid flow between said charging and triggering chambers;
said valving member has a recessed pilot pressure chamber formed therein; and
said stem has the extending end thereof disposed within said pilot pressure chamber, and has an axially extending passageway formed centrally thereof for accommodating fluid flow therethrough, whereby said fluid causes said valving member to prohibit communication between said exhaust and vent chambers.

9. Control means, according to Claim 8, wherein:
said chamber-defining means comprise an end cap, said end cap having radial ports formed therein, for communicating fluid flow between said charging and triggering chambers; and
said stem is disposed immediately and slidingly adjacent the inner terminations of said ports to throttle fluid flow through said ports.

10. Control means, according to Claim 1, wherein:
said slidable means comprise a valving member disposed between said exhaust and vent chambers for throttling fluid flow therebetween,
a poppet slidable within said valving member, and
a sleeve disposed between said poppet and valve member;
said sleeve and said valving member both have radially disposed ports formed therethrough for accommodating fluid flow between said charging and triggering chambers and said poppet has a closure member on one end thereof, effective to prohibit fluid flow through said radially disposed ports.

11. Control means, according to Claim 10, wherein:
said sleeve has a narrow pilot pressure channel axially formed therethrough;
said closure member is a nose portion; and
further comprising means for urging said poppet toward said pilot pressure channel, whereby said nose portion closes said channel to fluid flow.

12. Control means, according to Claim 1, further comprising:
means for urging said slidable means in a given direction to enhance its responsiveness to said charging volume of fluid.

13. Control means, according to Claim 11, wherein:
said urging means are adjustable.

14. In a fluid actuated reciprocating power device having a reciprocating plunger, means for admitting fluid under pressure into said device to retract the plunger and charge the device to later drive the plunger on its power stroke, said plunger having a triggering surface, means cooperating with said plunger in its rearmost position to isolate said surface from such fluid during a charging cycle, valve means operable when the charging pressure reaches a predetermined value to admit fluid under pressure to said triggering surface to move the plunger to be driven forwardly on its power stroke, and a second valve means operated in delayed response to the action of the first valve means to open a vent to allow the fluid which actuated the plunger to be discharged during the retraction stroke of the plunger and operated at the start of the charging period to cut off such discharge.

15. Control means for a fluid-powered device, such as an impact ram or the like, having a moveable working member; said member being cylindrical and having a first charging chamber therewithin for receiving pressured fluid; said first chamber having means, responsive to an admittance of pressured fluid into said first chamber, automatically to vary the volume of said chamber;
means external of said member defining a return chamber also for receiving such admitted pressured fluid therewithin; and
means for admitting pressured fluid simultaneously to both said charging and return chambers to charge both chambers with pressured fluid, for subsequent valving release of said pressured fluid for bearing upon a surface of said member to effect operational movement of said member;
comprising valving means, interposed between said both chambers and said surface, for prohibiting and for accommodating communication of said both chambers with said surface;
said valving means being operative, in response to a predetermined fluid pressure in said chambers automatically to release triggering pressured fluid simultaneously from said both chambers to bear upon said surface, causing automatic triggering and said operational movement of said member.